July 1, 1924.
W. G. BERGMAN
GLASS MOLDING MACHINE
Filed Dec. 24, 1919
1,499,334
4 Sheets-Sheet 1
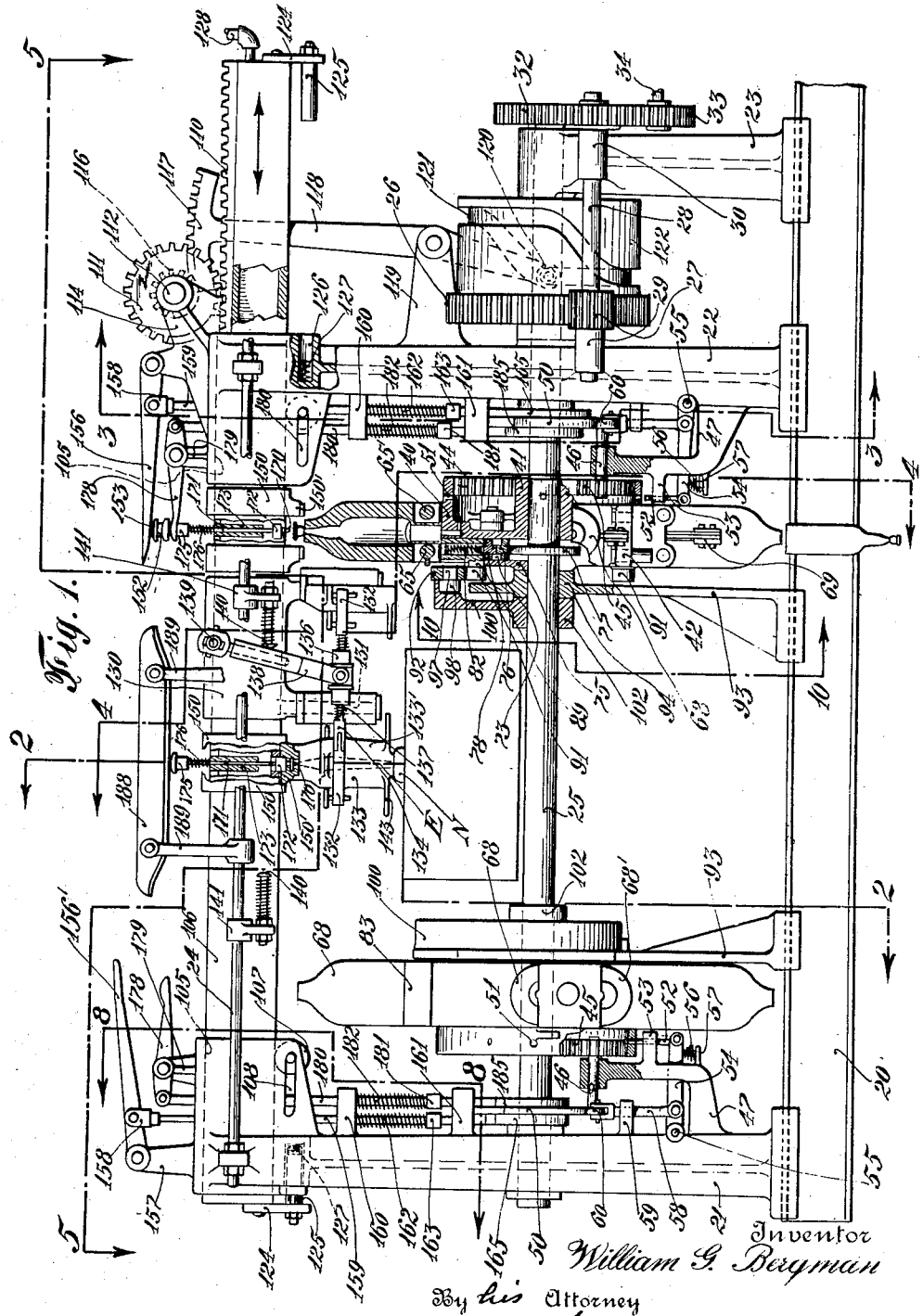
Inventor
William G. Bergman
By his Attorney
William E. Richards

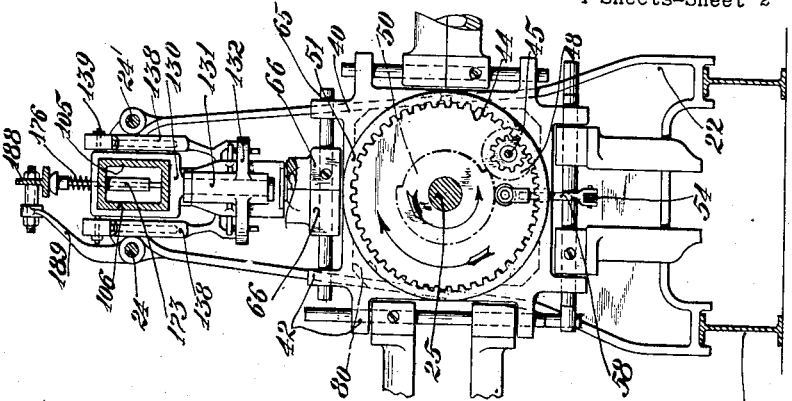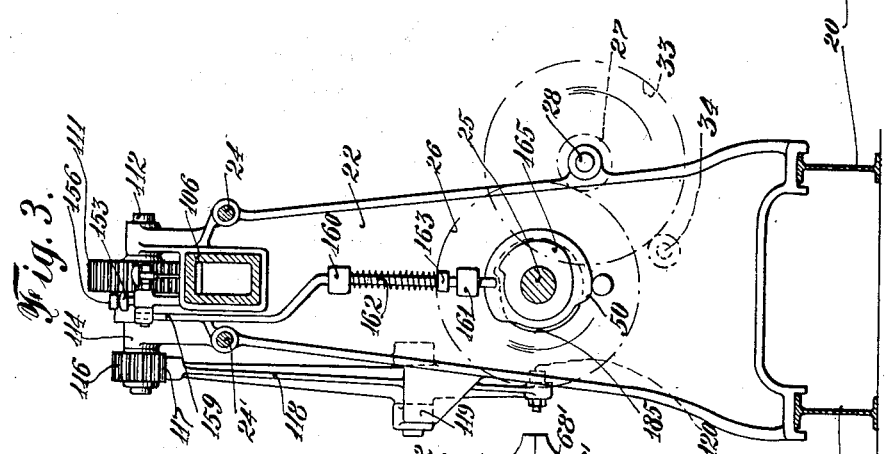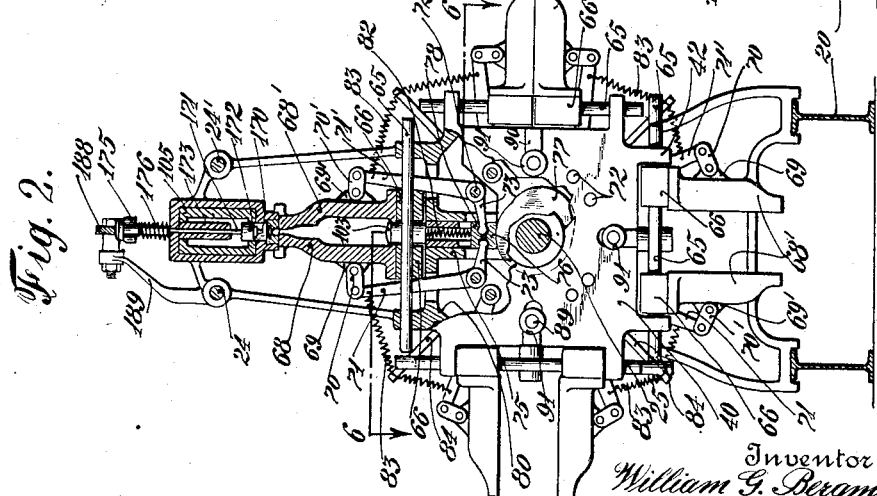

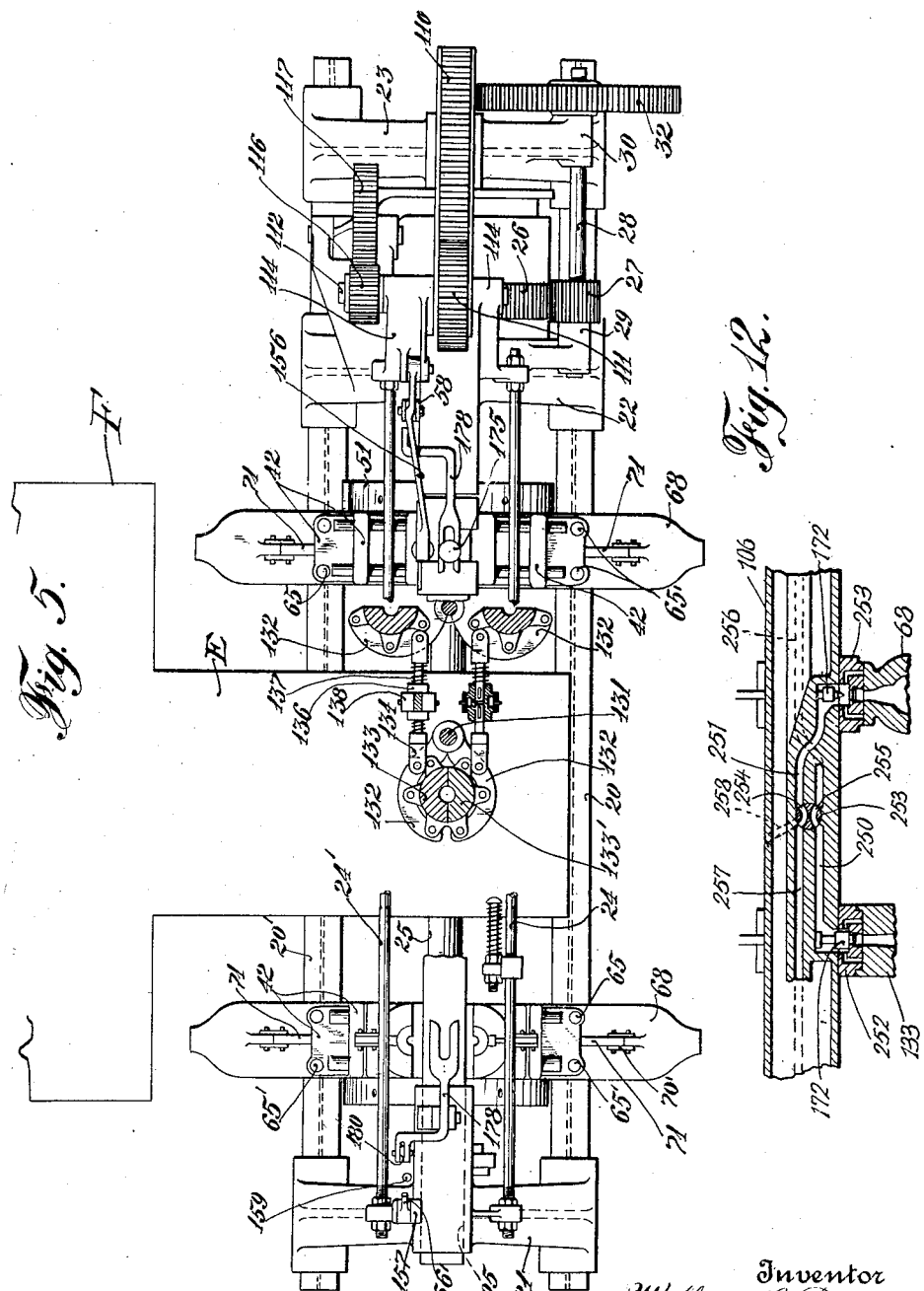

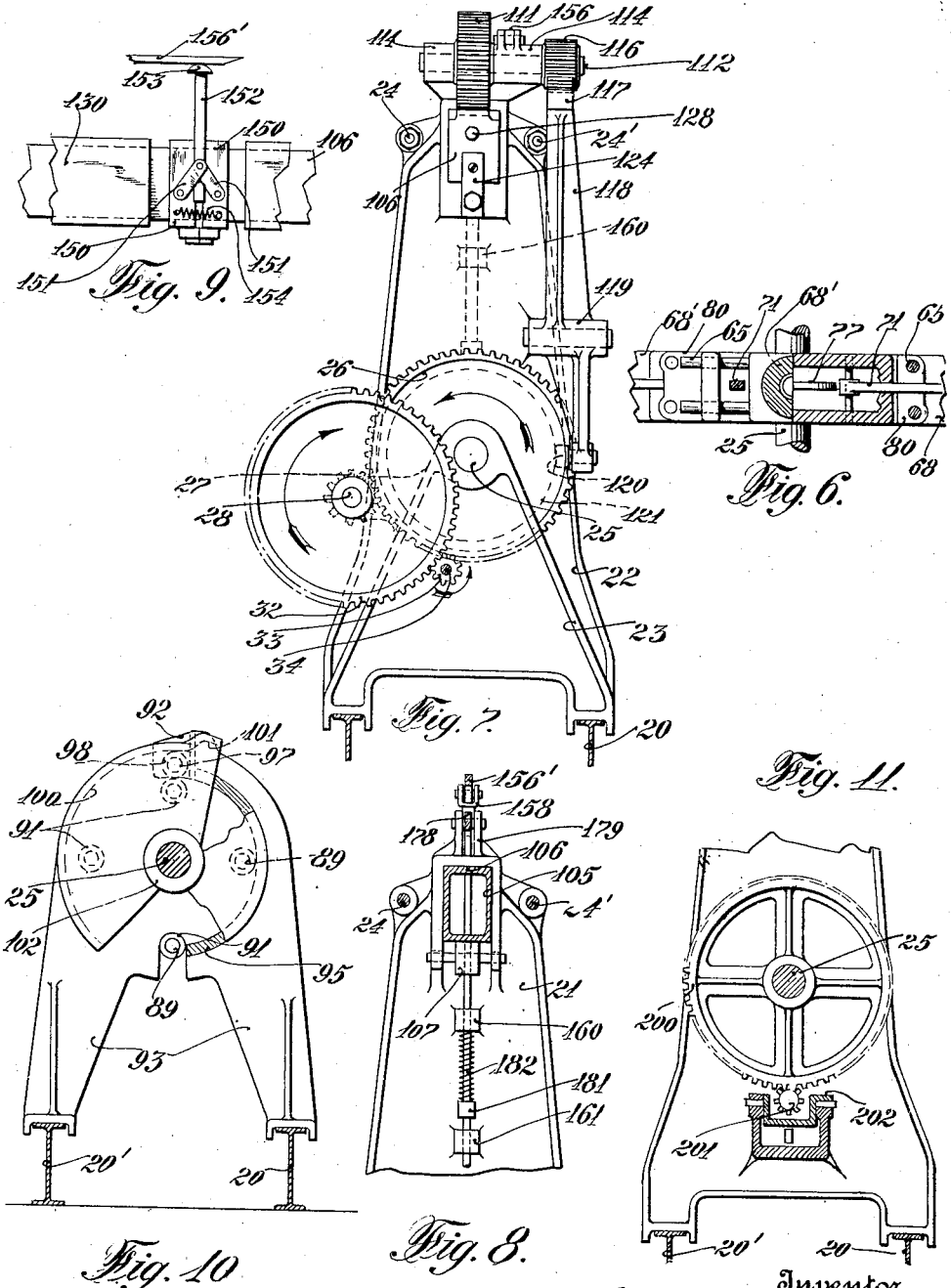

Patented July 1, 1924.

1,499,334

UNITED STATES PATENT OFFICE.

WILLIAM G. BERGMAN, OF TOLEDO, OHIO.

GLASS-MOLDING MACHINE.

Application filed December 24, 1919. Serial No. 347,204.

*To all whom it may concern:*

Be it known that I, WILLIAM G. BERGMAN, a citizen of the United States, residing at Toledo, county of Lucas, and State of Ohio, have invented certain new and useful Improvements in Glass-Molding Machines, of which the following is a specification.

This invention relates to improvements in glass molding machines, and particularly to those used in making hollow articles, of the bottle and jar type.

The main objects are to produce a relatively inexpensive machine of high efficiency, simple in its parts, easily operated, and which requires less than the ordinary floor space used by like mechanisms of corresponding capacity.

To produce a machine in which various designs, lengths and weights of articles may be made at the same time, without loss of material or reheating the same.

To produce a machine having two or more rotative mold carrying elements in each of which a plurality of molds may be engaged in such manner as to be continuously progressively operating, gathering material for blanks on one side and blowing the articles on the other side.

And finally, to produce a machine of unusually high capacity and in which far less fuel than usual is required.

These and many other objects and advantages, which will become apparent as the description progresses, are attained by the novel construction and combination of parts and principles hereinafter described and shown in the accompanying drawings, forming a material part of this disclosure, and in which:—

Figure 1 is a side elevational view of a glass molding machine made in accordance with the invention, certain parts being broken away and others shown in section in order to disclose the construction.

Figure 2 is a transverse vertical sectional view, taken on line 2—2 of Figure 1.

Figure 3 is a similar view taken substantially on line 3—3 of Figure 1.

Figure 4 is another line sectional view taken on line 4—4 of Figure 1.

Figure 5 is a top plan view of the machine, certain parts being in section, the same being taken on line 5—5 of Figure 1.

Figure 6 is a fragmentary horizontal sectional view taken on line 6—6 of Figure 2.

Figure 7 is an end elevational view looking from the driving end.

Figure 8 is a fragmentary vertical transverse sectional view taken on line 8—8 of Figure 1.

Figure 9 is a fractional side view of the hollow beam and discharge device over one of the mold carriers.

Figure 10 is a vertical sectional view taken on line 10—10 of Figure 1.

Figure 11 is a fragmentary vertical sectional view, similar to Figure 4, but showing a modification in construction.

Figure 12 is a fragmentary longitudinal vertical sectional view showing a modified arrangement whereby a suction is applied to the blank molds and an air pressure to the finishing molds.

The embodiment of the machine shown in the drawings rests upon a pair of rolled steel channel beams 20 and 20' arranged in parallel adjacent to the glass furnace F having a filling device E extending outwardly into the machine.

Fixed on the beams are a pair of standards 21 and 22, and a vertical bracket or pillow block 23, the standards being rigidly connected by a pair of longitudinal tie rods 24 and 24'.

Journalled in the pillow block 23 and standards 21 and 22, is a shaft 25 having fixed upon it a spur gear 26, meshing with a pinion 27 secured on a spindle 28, rotatable in bearings 29 and 30 formed respectively with the standards 22 and pillow block 23. This spindle 28 has fixed on it a spur gear 32 meshing with a pinion 33 fixed on the shaft 34 of a motor or other prime mover, not shown.

The machine shown being double, there are loosely mounted on the shaft 25 two mold carriers 40, the same being substantially rectangular blocks having central lateral hubs 41 and pairs of lugs 42 extending from each of its four sides, while formed with the outer sides of the carriers are internal gears 44.

Engaging in these internal gears are spur pinions 45 mounted on spindles 46 rotatable in the upper ends of brackets 47 formed on the opposite sides of the standards 21 and 22, the spindles 46 having fixed at their opposite ends friction discs 48.

Fixed on the shaft 25 are face cams 50, a portion of their peripheries making frictional driving contact with the discs 48 at each revolution of the shaft, thereby transmitting motion through the discs and gear train to the mold holders and, due to the proportions of the gears and cams, turning the carriers one-quarter of a revolution.

In order to positively lock the mold carriers at each quarter turn, openings 51 are formed through the annular parts of the carriers close to the internal gear portions, and engageable therein are stop pins 52, guided in lugs 53 extending from the bracket 47, and pivoted to the free ends of levers 54 fulcrumed at their opposite ends on pins 55 set in the standards, the levers being normally pressed up by coiled compression springs 56 seated on the lugs 57 of the bracket 47.

These levers have pivoted to them plungers 58, guided in lugs 59, and forked at their upper ends, the forks carrying rollers 60 actuated by the cams 50, so as to alternately lock and release the mold carriers, which, as before mentioned, are rotated by the same cams by means of the friction discs 48.

Pairs of rods 65 and 65', arranged in parallel, are slidably engaged in the pairs of lugs 42 of the mold carriers, and on these rods, between the lugs, are guide blocks 66 and 66', the blocks 66 being secured to the rods 65 and freely slidable on the rods 65', while the blocks 66' are fixed on the rods 65' and slidable on the rods 65, the arrangement being such as to obtain relatively long bearing surfaces.

Secured to the guide blocks 66 and 66' are the mold halves, respectively 68 and 68' (see Fig. 2), the same being formed interiorly to give the required shape to the article to be cast therein, and provided on their outer sides with lugs 69 and 69', connected by links 70 and 70', with the outer ends of the longer arms 71 and 71' of bell-crank levers which pass through slotted openings in four sides of the mold carrier 40, into its hollow chamber 80 and are fulcrumed on pins 72 extending between the walls of the chamber.

The short arms 73 and 73' of the bell-crank levers pass through appropriate radial slots in tubular arms 75, extending from the hubs of the mold carriers to their four side walls through which the arms 71 and 71' enter, and rest upon the solid lower ends of hollow plungers 76 movable in the bores of arms 75. The ends of lever arms 73, 73' are yieldingly held against the said lower ends of the plungers by means of blocks 78 resting on the upper surfaces of the ends of said lever arms and pressed yieldingly thereagainst by coiled compression springs 82 located in the hollow plungers and bearing between the lever ends and the closed upper ends of the plungers. As will be apparent, operative action of the plungers on the levers is transmitted through the blocks 78 held in place by the springs 82, thus providing safety means preventing breaking of parts in the event of the molds sticking or failing to close properly. The molds are opened by means of tension springs 83 attached at one of their ends to the lever arms 71 and 71', near the links 70 and 70', the other ends of the springs being secured to bars 84, the same exerting a direct pull upon the mold sides 68 and 68', holding them normally apart.

The molds are closed in the following manner: Fixed upon each of the plungers 76 are lateral pins 89 passing through slots 90 formed in the inner side walls of the mold carriers 40, and freely mounted on the pins are rollers 91.

These rollers, as the mold carrier is rotated, are brought into the path of a vertically movable slide block 92 operative within suitable guides extending inwardly from brackets 93 fixed upon the base elements 20 and 20' which brackets are provided with bored hubs 94 through which the shaft 25 passes. Formed on the brackets 93 are lateral segmental flanges 95 concentric with the shaft 25 and adapted to act as restraining guides for the rollers 91 during the time they are in contact with said flanges.

Secured upon the shaft 25 by hubs 102 adjacent the bracket 93 are cam brackets 100 having an inturned segmental cam provided at its upper edge with outwardly flared leading edges 101. The blocks 92 carry pins 97 upon which are rotatably mounted the rollers 98 which are adapted to contact with the segmental cam 100, and thereby force the sliding blocks and rollers towards the axis of shaft 25, the rollers 98 contacting with the rollers 91, thus moving the plungers 76 downwardly and permitting the springs 82 to cause the molds to close by the action of the bell crank arms 71, 73 and 71', 73'.

When the rollers pass off the guide flanges 95 the molds are caused to separate due to the action of the springs 83, and the molded articles released as indicated in Figure 1.

The bottoms of the molded articles are shaped by formers 103 secured in the mold carriers and extending outward between the blocks 66 and 66' in such manner as to avoid interference with their operation, the formers being always central with the mold sides.

From the foregoing, the operation of intermittently rotating, locking, closing and opening of the molds will be clear.

The action of the neck molds and filling devices will now be described.

The upper portions of the standards 21 and 22 are extended inwardly towards each other and have formed through them aligned rectangular finished openings 105

(see Figs. 1 and 8), adapted to receive and guide a hollow beam 106, supported on rollers 107, the pintles of which operate freely in slots 108 formed in the extension of the standards below the hollow beam.

The beam is reciprocated by means of a rack 110 on its upper surface, at the driving end of the machine, the rack being in mesh with a spur gear 111, fixed upon a shaft 112 mounted transversely in brackets 114 extending up from the standard 22. On the rear end of the shaft 112 is fixed a spur pinion 116, its teeth being engaged with a segment 117, formed with a lever arm 118, pivoted in a bracket 119 extending from the standard 22, and having at its lower end a roller 120 engaging in the groove 121 of a cam 122 fixed upon the shaft 25 between the standard 22 and pillow block 23. Thus as the shaft 25 is rotated, reciprocating rectilinear movement will be imparted to the beam 106.

Fixed upon the covered ends of the beam 106 are plates 124, carrying inwardly extending cylindrical elements 125 adapted to closely fit within bored openings 126 formed in the standards, the same acting as dash pots to cushion the limits of movement of the beam and as a further means, springs 127 are fixed in the bottoms of the dash pots, the same tending to give a rebounding effect to the beam.

Either compressed air or a vacuum effect is supplied within the hollow beam 160 by the pipe 128, the same being used to control the flow of molten glass from the extension E by valves carried by the beam as follows:—

A mold carrier bracket 130, (see Figs. 1 and 4), securely mounted on the beam 106, has downwardly extending vertical pins 131 acting as hinge elements for the blank mold supports 132, carrying the mold halves 133 and 133' (Fig. 5), the pairs of supports 132 being connected by links comprised of forks 134 having stems 135 received in sleeves 136 in which they are limitedly independently slidable, and surrounded by coiled compression springs 137 abutting against the forks and sleeves respectively.

The sleeves have engaged with them upwardly extending levers 138 (see Figs. 1 and 4) formed in telescopic sections and pivoted on a pin 139 fixed in the bracket 130.

The sides of the levers 138 are adapted to make contact with buffers 140 (Fig. 1) secured in brackets 141 fixed on the tie rods 24 and 24' so as to open or close one pair of the mold halves at the full limit of movement of the beam 106, thus operating alternately each mold. These molds may have near their extreme lower ends baffle plates 143 adapted to restrain the heat from issuing from the central glass discharge nozzle N on the filler extension E.

The neck molds 150 are arranged in pairs slidable on the beam 106 and are moved by their engagement with pivoted links 151 (Fig. 9), in turn pivoted at their free intersecting ends to plungers 152 having enlarged rounded heads 153, which upon being forced downward separate the mold holders normally drawn together by the coiled tension springs 154.

Pressure is applied to the heads 153 by levers 156 and 156', the former being pivoted on the bracket 114 and the latter on a bracket 157 extending up from the standard 21, both levers having their free ends towards the center of the machine.

Pivotally attached to these levers are forks 158 engaged with rods 159, guided in lugs 160 and 161, respectively upper and lower, extending inwardly from the standards.

Collars 163 are fixed on the rods 159 against which rest the lower ends of coiled encircling springs 162, pressing the rods and levers downwardly and holding the lower ends of the rods in intimate contact with cams 165 fixed on the shaft 25 at the sides of the cams 50, the cams being so formed as to raise the levers at the proper moment, allowing the neck mold halves to come together.

These neck molds are provided with removable form pieces 150' so as to permit different shapes to be produced and are closed at all times except immediately after the article is blown when they instantly open in order to let the article be conveyed away in the molds 68.

The insides of the necks are formed by the projections 170 of plungers 171, carrying the air valves 172 permitting compressed air to enter the article in the molds 68 from the hollow beam 106. These plungers are guided in sleeve-like projections 173 formed in the interior of the hollow beam, the plunger stems extending up through the beam 106 and being provided with annularly recessed heads 175 held in a normally raised position by the encircling coiled compression springs 176.

Engageable in the recesses of the heads 175, are the forked ends of levers 178, offset laterally and pivoted to brackets 179 on the tops of the standards, the levers having rear extending portions engaged by rods 180 arranged parallel to the rods 159 and guided in openings in the lugs 160 and 161. These rods are also provided with fixed collars 181 and pressure springs 182, holding the ends of the rods in engagement with cams 185 fixed on the shaft 25 on the opposite side of the cams 50 to the cams 165.

These cams 185 have a quick release so that the moment the article is fully blown the valve 170 will be caused to seat itself restraining further flowing of compressed air.

A fixed cam bar 188, supported by bracket extensions 189 from the rod 24 acts to depress the heads 175 as the molds are carried thereunder, thus moving the rods 171 to their lowermost position, in which the neck forming projection is in engagement with the neck mold, this action taking place as the parts are in the position shown at the left of Fig. 1 while the blank molds are in engagement with the discharge neck N of the furnace, and as the molds are moving to and from the neck N. The springs 176 normally hold the rods 171 and associated parts in the middle or neutral position in which the air valves 172 are seated. When the rods 171 are moved downwardly by the cam 188 they are still closed and are opened only by the action of the levers 156 cam 165 and associated parts in timed operation and only when the valves are aligned with the finishing molds.

It is to be noted that the dash pot devices 125 to 127 act as shock absorbers, producing a smooth action of the beam 106.

While four molds are shown as carried in the revolving carriers, it will be apparent that the machine may be designed to operate with a lesser or greater number according to its capacity.

These finishing molds obviously operate at substantially right angles to the blank molds and no appreciable time is lost in moving forward, while the cam 91 can be set to release the articles at any desired point, the articles being delivered to a conveyor discharging into the tempering leer in a well known manner.

The process of making an article is as follows; the blank mold receives glass stock at the nozzle, and moves horizontally towards the finishing mold, on its way opening, but still securing the glass blank.

When the glass arrives at the finishing mold, the latter closes. After the article is blown the neck mold opens, allows the finishing mold to pass and then moves to the nozzle for another charge.

Therefore, while at one end of the machine the article is being blown, at the other end glass is being gathered, the operations being timed in sequence and without waste of time or unnecessary delay.

It will be apparent that many modifications may be made without departing from the general scope of the invention, hence it is not desired to confine the structure to the limitation of the showings and general description.

In Fig. 12 I have shown an arrangement whereby a vacuum suction is caused to act on the blank molds to fill the latter while compressed air is simultaneously supplied to the finishing mold to form the article. In this arrangement the hollow beam 106 is formed or provided with a pair of conduits 250 and 251 leading respectively from form pieces 252 and 253 and having their ends controlled by the valves 172. These conduits as shown extend toward one another and are controlled by a rotary plug valve 253 having a pair of arciform ports 254 and 255 therein, conduit 250 leading to one side of the valve and conduit 251 leading to the opposite side of the valve. Formed in the hollow beam are a second pair of conduits 256 and 257 which lead respectively from a vacuum device and an air pressure device to the valve 253. The stem of valve 253 has a handle 258 which is adapted to be engaged by suitable stop members carried upon the frame of the machine as the beam reaches each end of its reciprocatory movement to turn the valve a quarter revolution. The conduits 250, 251, 256 and 257 are so arranged with respect to valve 253 as clearly shown in Fig. 12, so that when beam reaches its right hand position, which is the position shown, a passage is opened for the compressed air through conduit 257 port 254 and conduit 251 to the right hand form piece which is engaged by one of the finishing molds of the right hand set, a second passage leading from the left hand form piece, which engages the left hand blank mold, through conduit 250, port 255, conduit 256 whereby a suction may be exerted on the blank mold to fill the latter.

When the beam 106 reaches its left hand position the valve 253 is turned 90° which causes the compressed air conduit to be in communication, through port 255, with the left hand form piece 252 which is then in communication with the one of the left hand set of finishing molds, while the vacuum conduit is then in communication, through port 254, with the right hand form piece 253 which now engages the right hand blank mold.

Having thus described my invention, which I claim as new and desire to secure by Letters Patent is:—

1. A glass molding machine having a pair of spaced finishing molds, a hollow beam for supplying compressed air, a pair of blank molds carried by said beam, means for reciprocating said beam above said finishing molds to transfer the blanks to the latter, and means for controlling the air supply to said molds.

2. A glass molding machine having a constantly-rotating shaft, a pair of heads journalled thereon, sectional molds on said heads, means for rotating said heads intermittently, means for locking said heads during their cessation of motion, means for closing said molds when in a certain position, means for opening said molds when in a reversed position, and means for filling the respective molds on the two heads in alternate relation.

3. A glass molding machine having in combination a constantly driven rotary shaft, a pair of mold carriers freely mounted thereon, two part molds slidably mounted on each of the four sides of each carrier, means for intermittently actuating each carrier, means for locking said carrier during intermission, means for moving each part of said molds to or from a common center synchronously with the movement of its carrier, means for feeding molten glass into the respective molds on the different carriers alternately and means for blowing the glass in said molds.

4. A glass molding machine having a plurality of finishing molds and means for operation thereof, a pair of blank molds movable transversely of said finishing molds, a hollow beam on which said blank molds are carried, means for supplying compressed air to said hollow beam, means for alternately opening and closing said blank molds, neck molds adapted to engage with said blank molds, valves controlling the passage of air from said beam to said finishing molds and means for automatically operating said valves.

5. A glass molding machine comprising a pair of rotatable carriers, means for intermittently rotating said carriers, a plurality of finishing molds on said carriers, said molds having means for opening and closing, a hollow beam mounted to move reciprocatively in a plane above and transverse to said carriers, means for actuating said beam, shock absorbing elements cooperative with said beam, blank molds carried on said beam, means for operating said blank molds in conjunction with said finishing molds, and means for controlling compressed air received through said beam so as to blow articles in said molds.

6. A glass molding machine comprising a plurality of rotatable carriers, means for intermittently rotating said carriers, a plurality of finishing molds on said carriers and means for opening and closing the same, a beam mounted to reciprocate above said carriers, means for actuating said beam, blank molds carried on said beam, and means for operating said blank molds in conjunction with said finishing molds.

7. A glass molding machine comprising a rotatable holder, a plurality of molds formed in sections slidable on said holder, means for intermittently rotating said holder, and means for closing said molds comprising radially movable plungers carried in said holder, levers connecting said plungers to the mold sections, a cam member rotatable with said holder, and a non-rotatable and radially slidable element adapted to be engaged by said cam member and operate said plunger.

8. A glass molding machine comprising a pair of spaced blank molds for receiving molten glass, a reciprocatory beam on which said molds are mounted, a pair of spaced finishing molds, means for moving said blank molds to register with the respective finishing molds, and means for opening said blank molds while the same are moving toward the finishing molds.

9. A glass molding machine having a plurality of molds, a hollow beam for conducting compressed air to said molds, means for reciprocating said beam to deliver air to one of said molds at a time, said means comprising a driving shaft having a cam, a toothed sector operated by said cam to move reciprocatively, a rack on said beam, a gear engaging said rack, a second gear engaging said sector and reciprocatively rotated thereby.

10. A glass molding machine having a constantly rotating shaft, a mold carrier mounted on said shaft and carrying a plurality of molds, means for rotating said mold carrier intermittently, means for locking said carrier during its cessation of motion comprising a cam on said shaft, slots in the periphery of said carrier, a locking lever directly actuated by said cam having pins attached thereto adapted to be alternately inserted into and withdrawn from said slots on actuation of said rocking lever by said cam.

11. A glass molding machine having a constantly rotating shaft, a plurality of heads journalled thereon, molds on said heads, means for rotating said heads independently and intermittently, means for locking said heads during their cessation of motion comprising a cam on said shaft for each of said heads, slots in said heads, a rocking lever for each head having pins attached thereto adapted to be directly actuated by said cam to cause said pins to be alternately inserted into and withdrawn from said slots on actuation of said rocking lever by said cam.

12. The combination with the discharge neck of a glass furnace, of a glass molding machine comprising a plurality of mold carriers mounted on opposite sides of said discharge neck, a plurality of finishing molds mounted on said carriers, a blank mold for each of said carriers mounted for reciprocation above said discharge neck and carriers and means to intermittently reciprocate said blank mold to transfer a charge of molten glass from said discharge neck to said finishing molds.

13. The combination with the discharge neck of a glass furnace, of a glass molding machine comprising a plurality of mold carriers rotatably mounted on opposite sides of said discharge neck, a plurality of finishing molds mounted on said carriers, a blank mold for each of said carriers mounted for reciprocation above said discharge neck and carriers, means to intermittently reciprocate said blank mold to transfer a charge of molten glass from said discharge neck to said finishing molds, and means operating in timed relationship with said reciprocating means to rotate said mold carriers during said reciprocation.

14. A glass molding machine having a plurality of finishing molds and means for operation thereof, a plurality of blank molds movable transversely of said finishing molds, a hollow beam on which said blank molds are carried, means for supplying compressed air to said hollow beam, a driving shaft having a cam, valves controlling the passage of air from said beam to said finishing molds, means for automatically operating said valves comprising a rocking lever engaging each valve, and a connecting rod pivoted to said rocking lever and reciprocated by said cam.

15. A glass molding machine comprising a plurality of holders, a plurality of molds carried on said holders, means for periodically imparting rotary movement to said holders, a hollow beam communicating with said molds, means for applying an air pressure or exerting a suction through said beam, and means for conveying molten glass from a furnace to said molds.

16. In a glass blowing machine, a pair of finishing molds spaced apart, a pair of blank molds located between said finishing molds, means for simultaneously applying suction and air pressure to one of said blank molds and one of said finishing molds, and means for alternating said action between the respective molds of each pair.

17. In a glass blowing machine, a pair of finishing molds spaced apart, a pair of blank molds located between said finishing molds, means for simultaneously applying suction and air pressure to one of said blank molds and one of said finishing molds, and means for alternating said action between the respective molds of each pair, said means including a reciprocatory beam having an air pressure and a suction conduit therein, adapted to be brought into communication with the proper molds as the beam reciprocates.

18. The combination with the discharge neck of a glass furnace of a glass molding machine having a rotating shaft, a plurality of mold carriers rotatably mounted on said shaft upon opposite sides of said discharge neck, a plurality of finishing molds mounted on each of said carriers, means to transfer a charge of molten glass from said discharge neck to each of said carriers, and means to reciprocate said transfer means constructed and arranged to cause a charge of glass to be delivered alternately to each of said carriers.

19. The combination with the discharge neck of a glass furnace of a glass molding machine having a rotating shaft, a plurality of mold carriers rotatably mounted on said shaft upon opposite sides of said discharge neck, a plurality of finishing molds mounted on each of said carriers, means to transfer a charge of molten glass from said discharge neck to each of said carriers, means to reciprocate said transfer means constructed and arranged to cause a charge of glass to be delivered alternately to each of said carriers, and means to intermittently rotate said mold carriers during the reciprocation of said transfer means.

20. The combination with a glass furnace having a discharge neck of a glass molding machine having a set of finishing molds on each side of said neck, a single blank mold for each set of finishing molds, means for intermittently reciprocating said blank molds constructed and arranged to cause the blank mold for each of said sets to be reciprocated into alternate engagement with said discharge neck and its respective finishing molds to deliver a charge of molten glass to said finishing molds, means to release said charge from said blank mold as it is moved into engagement with its respective finishing mold, and means to hold said charge as it is released from said blank mold until it is engaged by said finishing mold.

21. The combination with a glass furnace having a discharge neck of a glass molding machine having a set of finishing molds on each side of said neck, a single blank mold for each set of finishing molds, means for intermittently reciprocating said blank molds constructed and arranged to cause the blank mold for each of said sets to be reciprocated into alternate engagement with said discharge neck and its respective finishing molds to deliver a charge of molten glass to said finishing molds, means to release said charge from said blank mold as it is moved into engagement with its respective finishing mold, means to move said finishing molds into position to be engaged by said blank molds simultaneously with the movement of said blank molds, means to hold said finishing molds against movement during the stoppage of the reciprocation of said blank molds, and means to admit fluid pressure alternately to each set of said finishing molds while said blank molds and finishing molds are stationary.

In testimony whereof I have affixed my signature.

WILLIAM G. BERGMAN.